United States Patent Office 2,957,869
Patented Oct. 25, 1960

2,957,869
HYDROXYBENZYLIDINEAMINORHODANINES

Richard E. Strube, Kalamazoo, Mich., assignor to The Upjohn Company, Kalamazoo, Mich., a corporation of Delaware No Drawing. Filed Feb. 2, 1959, Ser. No. 790,358

3 Claims. (Cl. 260—240)

This invention relates to novel derivatives of 3-aminorhodanine and is more particularly concerned with 3-(hydroxybenzylideneamino)rhodanines.

The novel compounds of the invention can be represented by the following general formula:

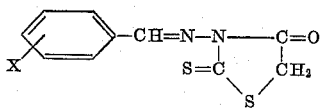

wherein X represents a hydroxyl group.

The novel compounds of the invention possess valuable activity as enzyme inhibitors. Illustratively, the compounds of the invention inhibit the enzyme system 5-hydroxytryptophan decarboxylase which is responsible for the conversion of 5-hydroxytryptophan to serotonin in the body [Udenfriend et al., J. Biol. Chem. 224, 803 (1957)]. Whilst the precise role which serotonin plays in the complex series of chemical reactions occurring in the brain, both normal and abnormal, is not yet clear, it is becoming increasingly evident that serotonin does have a significant effect on the manner in which the brain functions, and may be a causative agent in mental disease. 5-hydroxytryptophan is known to be the precursor of serotonin released in the brain (serotonin itself does not cross the blood-brain barrier) [see Fed. Proc. 15, 402 and 493 (1957)]. Hence, the novel compounds of the invention which, as stated above, inhibit the enzyme responsible for the conversion of 5-hydroxytryptophan to serotonin, provide a means of regulating the supply of serotonin to the brain.

The novel compounds of the invention also inhibit other decarboxylases. Illustratively, the novel compounds of the invention inhibit the enzyme system dihydroxyphenylalanine decarboxylase and like decarboxylases, thus providing means of regulating bodily levels, including brain levels, of pharmacologically active amines such as dopamine, epinephrine, and norepinephrine. The regulation of serotonin, dopamine, epinephrine, norepinephrine, etc., is useful in the management of abnormal conditions such as mental disease, inflammations, allergies, and gastro-intestinal hypermotility.

The novel compounds of the invention can be prepared in a convenient manner by reaction of the appropriate hydroxybenzaldehyde with 3-aminorhodanine in the presence of an acid medium. Preferably the reaction is carried out in the presence of acetic acid but other suitable media include a solution of acetic acid or a mineral acid, such as hydrochloric acid, in an inert solvent such as dioxan or a lower alkanol, for example, methanol, ethanol, isopropanol, and the like. The proportions of the reactants employed are preferably equimolar. The reaction can be carried out at room temperature (approximately 20° C.) but it is preferable to heat the reaction mixture at the boiling point thereof or at approximately 100° C., whichever is the lower temperature, for a short period of time, preferably from one to three hours. The desired compound separates from the reaction mixture on cooling and can be isolated therefrom by filtration. The desired compound can be purified, if necessary, by conventional procedures, for example, by recrystallization from a suitable solvent, for example, acetic acid, ethanol, and the like.

When employed in therapy the novel compounds of the invention can be combined with solid or liquid pharmaceutical carriers and formulated in the form of tablets, powder packets, or capsules, using starch and like excipients, or dissolved or suspended in suitable solvents or vehicles, for oral or parenteral administration.

The following examples are illustrative of the products of the present invention, but are not to be construed as limiting.

*Example 1.—3-(p-hydroxybenzylideneamino)rhodanine*

To a solution of 7.4 g. (0.05 mole) of 3-aminorhodanine (Holmberg, J. prakt. Chem., 81, 462, 1910) in 25 ml. of acetic acid was added slowly, with stirring, over a period of about 7 minutes, a solution of 6.1 g. (0.05 mole) of p-hydroxybenzaldehyde in 20 ml. of acetic acid. The mixture so obtained was stirred and heated on the steam bath for a period of one hour before being cooled and allowed to stand at 0° C. overnight. The solid which had separated was isolated by filtration, washed with acetic acid, and dried in vacuo at 20° C. The material so obtained was recrystallized from acetic acid. There was thus obtained 11.1 g. (88% of theory) of 3-(p-hydroxybenzylideneamino)rhodanine. This compound, after recrystallization from acetic acid, washing with ether, and drying, was a crystalline solid which decomposed without melting on heating.

*Analysis.*—Calcd. for $C_{10}H_8N_2O_2S_2$: C, 47.60; H, 3.20. Found: C, 47.61; H, 3.42.

*Example 2.—3-(o-hydroxybenzylideneamino)rhodanine*

Using the procedure described in Example 1, but substituting salicylaldehyde for p-hydroxybenzaldehyde, there was obtained 3-(o-hydroxybenzylideneamino)rhodanine. This compound, after recrystallization from ethanol and drying, was a crystalline solid having a melting point of 180.5 to 181.5° C. (corr.); weight 10.6 g. (84% of theory).

*Analysis.*—Calcd. for $C_{10}H_8N_2O_2S_2$: N, 11.10; S, 25.42. Found: N, 10.89; S, 25.57.

*Example 3.—3-(m-hydroxybenzylideneamino)rhodanine*

Using the procedure described in Example 1, but substituting m-hydroxybenzaldehyde for p-hydroxybenzaldehyde, there was obtained 3-(m-hydroxybenzylideneamino)rhodanine in the form of a crystalline solid.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. The compound having the general formula:

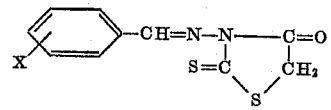

wherein X represents hydroxyl.
2. 3-(p-hydroxybenzylideneamino)rhodanine.
3. 3-(o-hydroxybenzylideneamino)rhodanine.

References Cited in the file of this patent

Sandstrom: Arkiv. for Kemi, vol. 8, pp. 490–493; 502–511; 519–520 (1956).

Chemical Abstracts, vol. 50, pp. 12073–12075 (1956). [Abstracts of Sanstrom, Arkiv. for Kemi, vol. 8, 487–521 (1955).]